United States Patent [19]

Tomasini

[11] Patent Number: 4,785,546

[45] Date of Patent: Nov. 22, 1988

[54] LITHOGRAPHIC PRODUCTION PLANNING SYSTEM

[76] Inventor: Achilles Tomasini, 20702 Cricket La., Lenexa, Kans. 66220

[21] Appl. No.: 57,630

[22] Filed: Jun. 3, 1987

[51] Int. Cl.$^4$ ............................................... B43L 13/02
[52] U.S. Cl. ...................................... 33/438; 33/1 N; 33/1 AA
[58] Field of Search .............. 33/1 N, 1 AA, 430, 438, 33/495, 615, 619, 623

[56] References Cited

U.S. PATENT DOCUMENTS

| | | | |
|---|---|---|---|
| 3,473,157 | 10/1969 | Little et al. | 340/172.5 |
| 3,908,275 | 9/1975 | Shimizu | 33/75 R |
| 4,151,649 | 5/1979 | Tatsuzawa | 33/1 N |
| 4,241,512 | 12/1980 | Chikanobu et al. | 33/438 |
| 4,268,969 | 5/1981 | Koenuma | 33/438 |
| 4,367,589 | 1/1983 | Mainka et al. | 33/1 N |
| 4,386,470 | 6/1983 | Perry | 33/438 |
| 4,419,823 | 12/1983 | Thorban | 33/1 M |
| 4,430,797 | 2/1984 | Eder | 33/1 M |
| 4,492,031 | 1/1985 | Koenuma | 33/1 PT |
| 4,625,410 | 12/1986 | Eder | 33/1 M |

FOREIGN PATENT DOCUMENTS

| | | | |
|---|---|---|---|
| 61755 | 10/1982 | European Pat. Off. | 33/430 |
| 2901601 | 7/1980 | Fed. Rep. of Germany | 33/438 |
| 2901651 | 7/1980 | Fed. Rep. of Germany | 33/438 |

OTHER PUBLICATIONS

Superior Electric, "Modulynx Motion Controls", Catalog MMC 781-4, 1984.
Superior Electric, "SLO-SYN Micro Series", Catalog MSC 1086, 1986.
Mutoh, "New Mutoh Drafting Machines"—Model LM Series.
Calcomp, "Digitizers"—9100 Series.
Crosfied, "Scaletec".
Superior Electric, "SLO-SYN DC Stepping Motors", Catalog DCM 1078-1, 1985.

Primary Examiner—Harry N. Haroian
Attorney, Agent, or Firm—Michael Yakimo, Jr.

[57] ABSTRACT

A production planning system for use in providing color-separated films to a litho platemaker. The system utilizes a programmed computer for gathering and storing information relative to various images of a particular production job. A computer/digital table/rotating arm structure allows for calculation of scaling and angling factors of the original image transparency relative to the size and orientation of the image within the final layout.

20 Claims, 4 Drawing Sheets

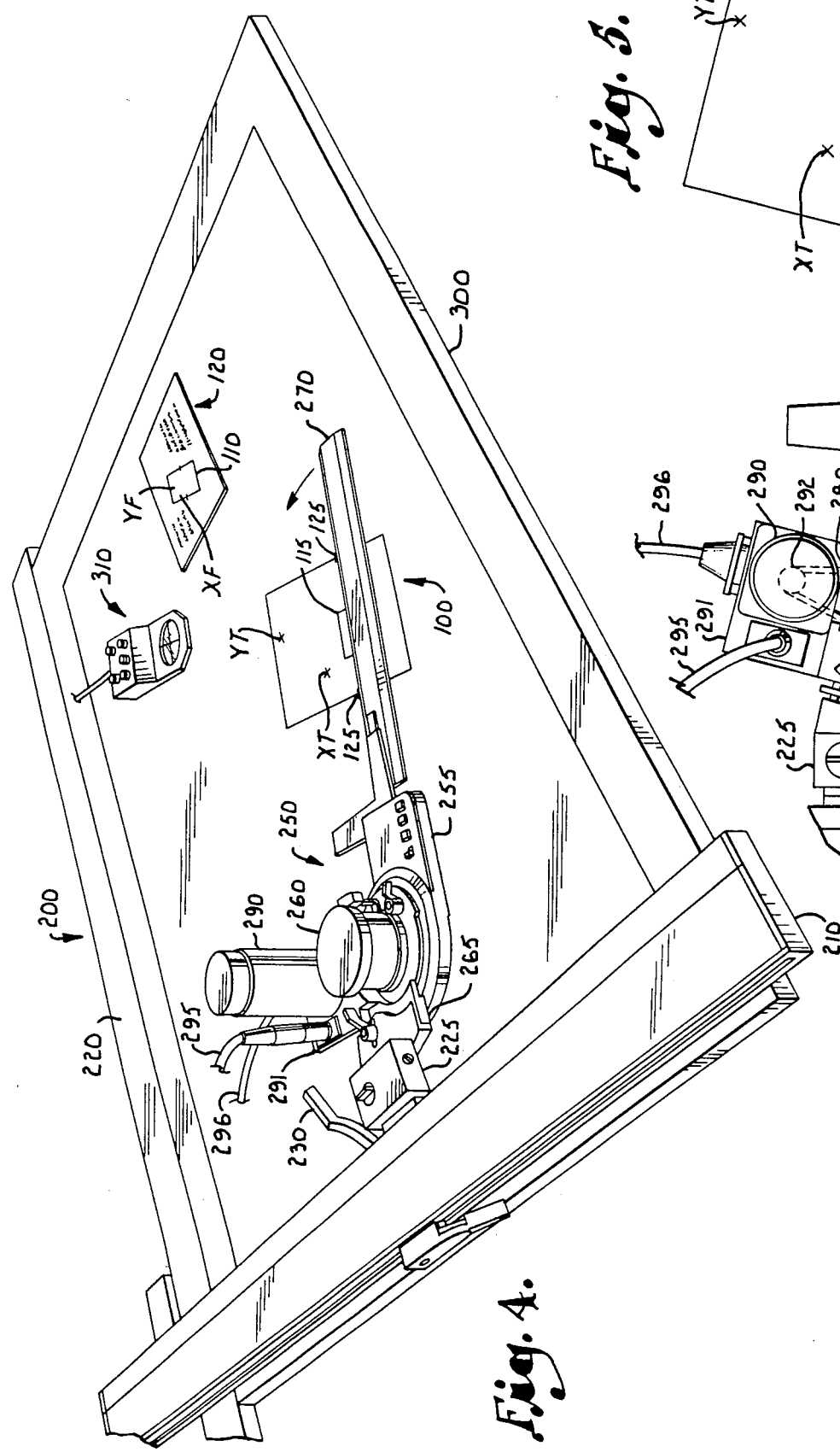
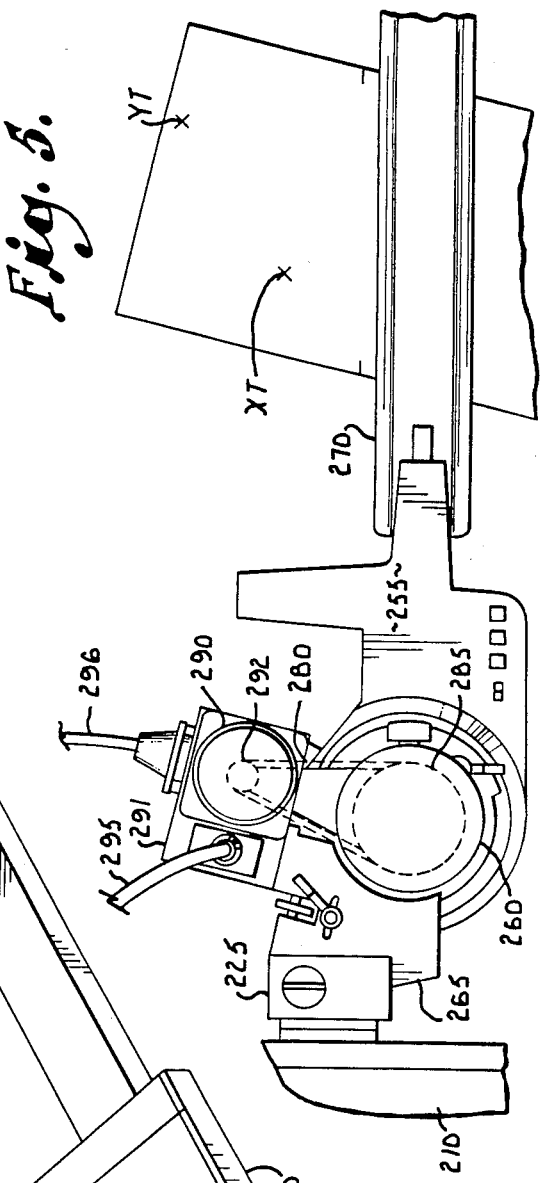

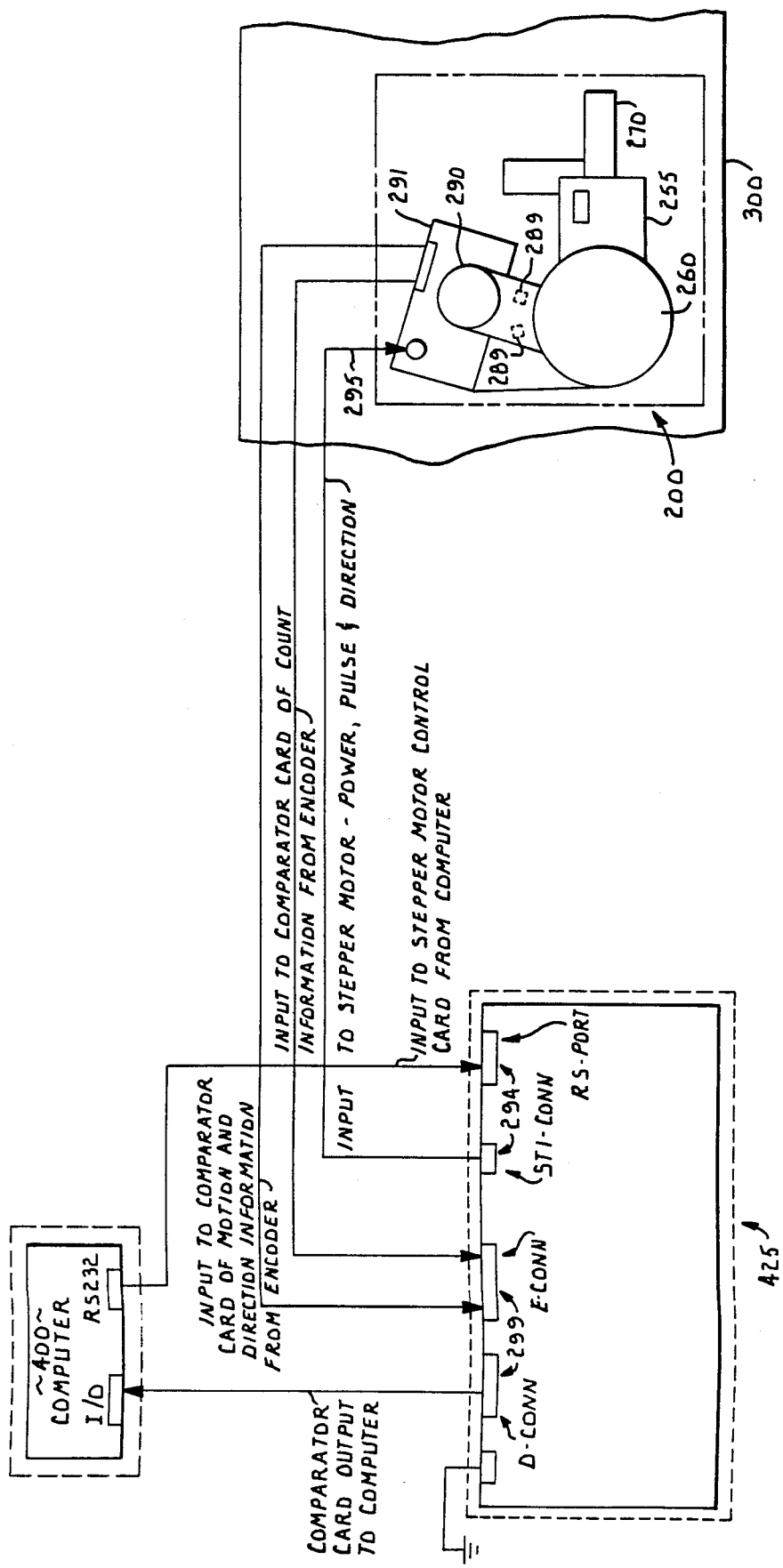

ic production planning system, and more particularly, to a system designed for the planning, control and production of color-separated films for selected lithographic jobs.

LITHOGRAPHIC PRODUCTION PLANNING SYSTEM

BACKGROUND OF THE INVENTION

This invention pertains to a lithographic production planning system, and more particularly, to a system designed for the planning, control and production of color-separated films for selected lithographic jobs.

Various phases for processing a final, image-containing layout into a color-separated film package for use by a lithographic platemaker are required. In such jobs, the images which are to appear in the form of color-separated films, are originally presented to the litho-processor in the form of original color-integrated, image transparancies. The transparencies are to be separated into selected colors for printing such as black, yellow, magenta and cyan (red and blue).

Sophisticated laser scanners are now utilized which separate an aligned, drum-loaded transparency into the selected colors and direct the color-separated images to preselected tape and/or disc storage for subsequent recall. Upon recall the images are fixed into a film format, one film for each separated color. These films are then presented to the platemaker who would normally make a printing plate for each separated color utilized in the final printing process.

The overall process of providing a color-separated film package includes various administrative and production phases and can be an extensive one. Important technical and administrative information must accompany each image through its various phases so as to present a cost effective, color-separated film package to the litho platemaker.

This process includes the basic phases of sales, production and accounting. The production phase further includes an initial pre-planning step and subsequent steps of scanning, dot etching, proofing and archiving. The functions of camera, pagination, stripping and shipping must also be considered.

During the process, administrative control of the image transparencies must be kept intact so that the original transparencies and their subsequently color-separated film images are readily available to the various production workers at the right size and orientation/rotation as on the final layout. It is particularly desirable to reduce the amount of time expended in reacquiring, redirecting and reprocessing the already existing transparency and color-separated image information.

Existing job technology utilizes pagination systems and laser scanners which keep limited track of the separated images. However, a great amount of time is still spent in the preplanning stage for recall, identification, organization, correction, labeling and look-up of the already available image information. Even when this image information is gathered from various sources in the pre-planning stage for a proper delivery of the original image to the laser scanner operator, less than half of the scanner operator's time, in some cases, is spent in actually exposing film.

Thus, it is desirable to place more emphasis on the organization, preplanning and management of the production system such that complete image information is readily available to all workers during all phases of the production job.

Several particular problems arise prior to or at entry of the provided image transparency into the job stream.

In some cases the original color transparency must be either enlarged or reduced relative to the size of the image that is to appear on the final product. Also, the final image must be correctly orientated or angled relative to a preselected axis, normally a 180 degree straight line. The orientation/rotation of the original transparency, relative to the selected axis, must be initially calculated so that the proportioned color-separated image is correctly angled on the films during the production process for submission to the platemaker.

At one time the degree of reduction/enlargement, relative to the original transparency image, was hand calculated. Also the degree of rotation of the originally provided image transparency, relative to a common axis, was hand calculated and adjusted to the correct angle by the production worker. Photographic enlargers with scaling readouts have also been used to calculate the degree of reduction/enlargement of the provided transparency.

More recently, the use of a digital table has made it possible to more readily calculate the degree of reduction/enlargement. The table includes a precision cursor interfaced with a microcomputer. Two identical points of the image on the final layout and the same points on the originally provided transparency are logged by the cursor. The location of these points, along preselected X and Y axes, are electronically determined by the digital table. Upon logging, these points are converted to computer-readable format for entry into the computer. The computer, via program software, determines the relative lengths of the straight lines between the selected points on the original and final image. This relationship translates to a percentage reduction or enlargement factor. The percentage factor is then inserted into the scanner by the scanner operator so that the color-separated images are properly enlarged or reduced by such a factor.

One form of the above apparatus is the Crosfield Scale-Tec digital table. This table also has built-in protractor which determines the difference in angling-/orientation between the original image transparency and the angle of the same image as it appears on the final layout. The original is taped onto the built-in protractor with the two identical points again being measured on the original and on the final layout. The cursor logs the position of the points on the digital table into the microcomputer. The computer displays the degree of difference between the angle of the original transparency and the angle of the same image on the final layout. The protractor with original image thereon is then manually rotated towards the angle of the final image with the above cursor logging procedure repeated. When the original transparency is at the required angle a zero difference is displayed on the microcomputer.

Although assumably effective in its operation, user error could creep into the various forms of angling determination, could creep into the various forms of angling determination, particularly if a number of time-consuming reiterations had to be entered into the computer and calculated thereby before a zero differential would be displayed.

In response thereto, I have devised a lithographic production planning system which generally comprises a digital table with cursor, a rotatable T-square assembly and a programmed microcomputer with peripheral hardware. The T-square assembly is responsive to data calculated by the programmed computer, such that it is rotated to a position indicative of a line which provides indicia so as to correctly position the original transparency on the scanner drum at the angle desired in the final advertising layout. The system further calculates the reduction/enlargement factor such that the original transparency is scanned and entered into storage at the correct proportional size. Each image is accompanied by a printed label releasably affixed to the transparency at the desired angle. The angled label contains job-related image information thereon so as to preserve the calculated angling indicia and assure control over the image transparency throughout the job stream.

The programmed microcomputer, as driven by its operating system and provided software, enables the operator to enter into memory various job-related data that must accompany each image. As such the system provides image information to various job personnel of what was done, who did it, what was used and time spent on the various phases. Such information may be recalled and/or entered into the system by various users during various phases of the production job. The entered information may then be recalled and reformatted into various reports as desired by the particular system user.

It is therefore a general object of this invention to provide a system which controls the use of color image transparencies in a lithographic color-separation process.

Another general object of this invention is to provide a system, as aforesaid, which enables user-selectable information to accompany a color transparency through the color-separation process.

A further object of the invention is to provide a system, as aforesaid, which calculates the percentage reduction or enlargement of a color image transparency relative to its final size in the final layout.

Another object of this invention is to provide a system, as aforesaid, which calculates the orientation of a color transparency relative to the orientation of the same image in the final layout.

Still another object of this invention is to provide a rotatable drafting arm for said system, as aforesaid, which is computer-rotatable to a computer-calculated position indicative of a correct final orientation of said original transparency.

Another object of this invention is to provide a system, as aforesaid, which allows for placement of indicia on said color transparency at a position which enables downstream users in said lithoprocess to properly orient said color transparency.

A still further object of this invention is to provide a comparator control card in said system which assures that said rotatable arm has been moved to said computer-calculated position.

Still another object of this invention is to provide apparatus, as aforesaid, with a method that positions an original image transparency on a scanner drum at the orientation of said image in the final layout.

Other objects and advantages of the invention will become apparent from the remainder of the specification and claims incorporated herewith.

BRIEF DESCRIPTION OF THE DRAWINGS

FIG. 4 is a perspective view illustrating the rotatable drafting arm on a digitizer table with an original transparency and final image layout thereon.

FIG. 5 is a top view of the drafting arm in FIG. 4 on an enlarged scale.

FIG. 6 is a block diagram illustrating the interface among the programmed computer, rotatable drafting arm, the stepper motor drive card and the comparator card.

DESCRIPTION OF THE PREFERRED EMBODIMENT

Figures 1, 2:
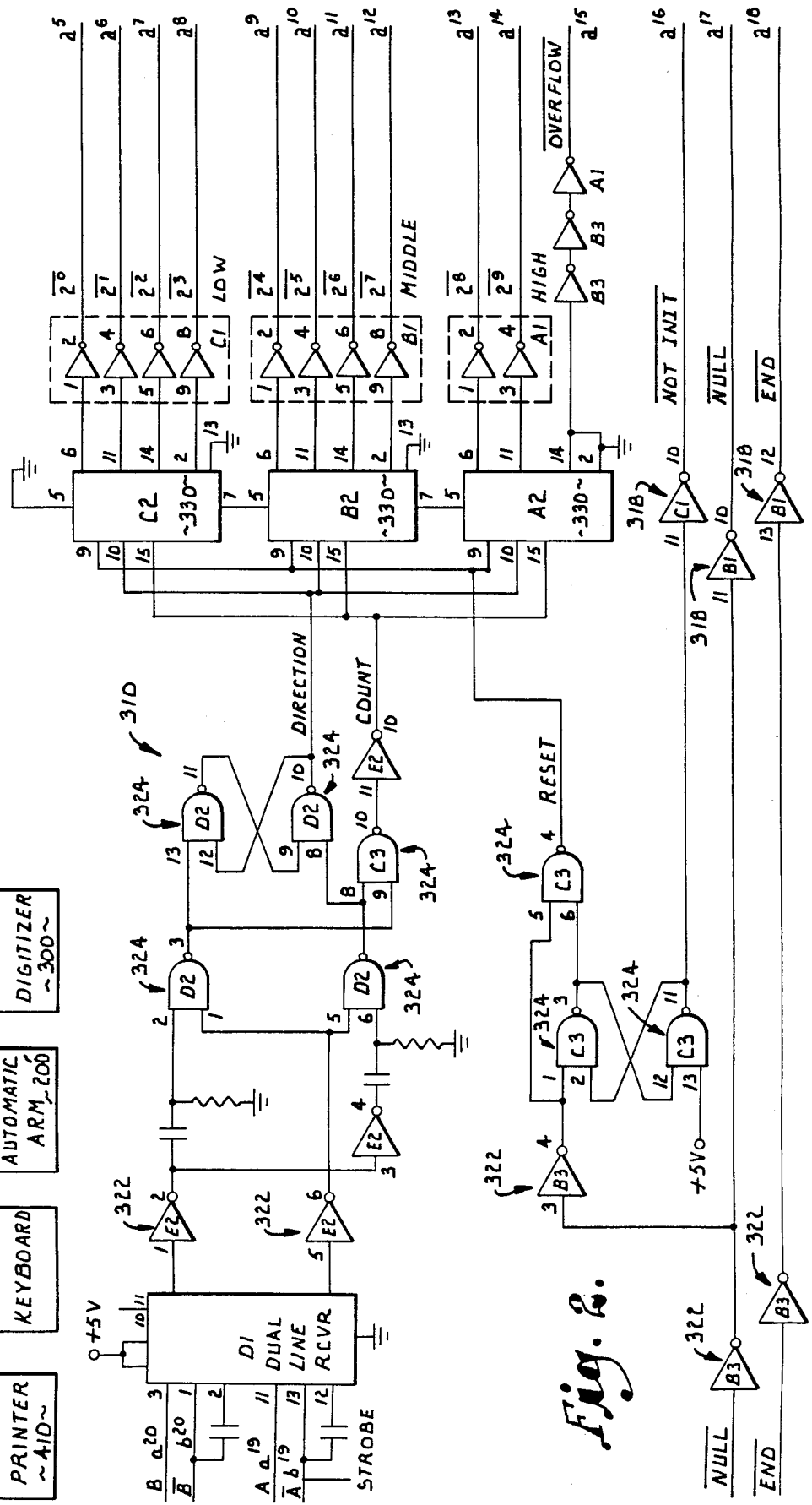
FIG. 1 is a block diagram of the interface of the computer with various hardware of the system inclusive of the rotatable drafting arm structure.
FIG. 2 is a schematic of the logic circuitry utilized in the comparator card of the rotatable drafting arm assembly.

Turning more particularly to the drawings, the basic system is as diagrammatically shown in FIG. 1 and generally comprises a combination of computer hardware, (mircrocomputer, w/tape and disk storage, video terminal), program software and a rotatable arm assembly. The system allow for the keyboard entry of image related information by production personnel into the microcomputer 400 so as to accompany an original color transparency 100 through the color-separation process. The digitizer 300/rotatable arm 200 combination, as interfaced with the programmed computer 400, calculates the reduction/enlargement of an original image transparency 100 and the orientation/angling of the same, relative to the final layout image 110, prior to color-separated entry of the image into tape or disk storage via a programmable laser scanner.

FIG. 6 diagrammatically illustrates the interfaces between the computer 400, the rotating arm assembly 200, the driver card input/output combination 294 associated with the assembly 200 and the parallel comparator card combination 299. As to be subsequently described, the computer 400 caluclates data which is delivered to the driver cards 294 so as to energize the stepper motor 290. The comparator card 299 counts the increments of movement at the stepper motor shaft 292 for reentry into the computer 400.

Figure 3:
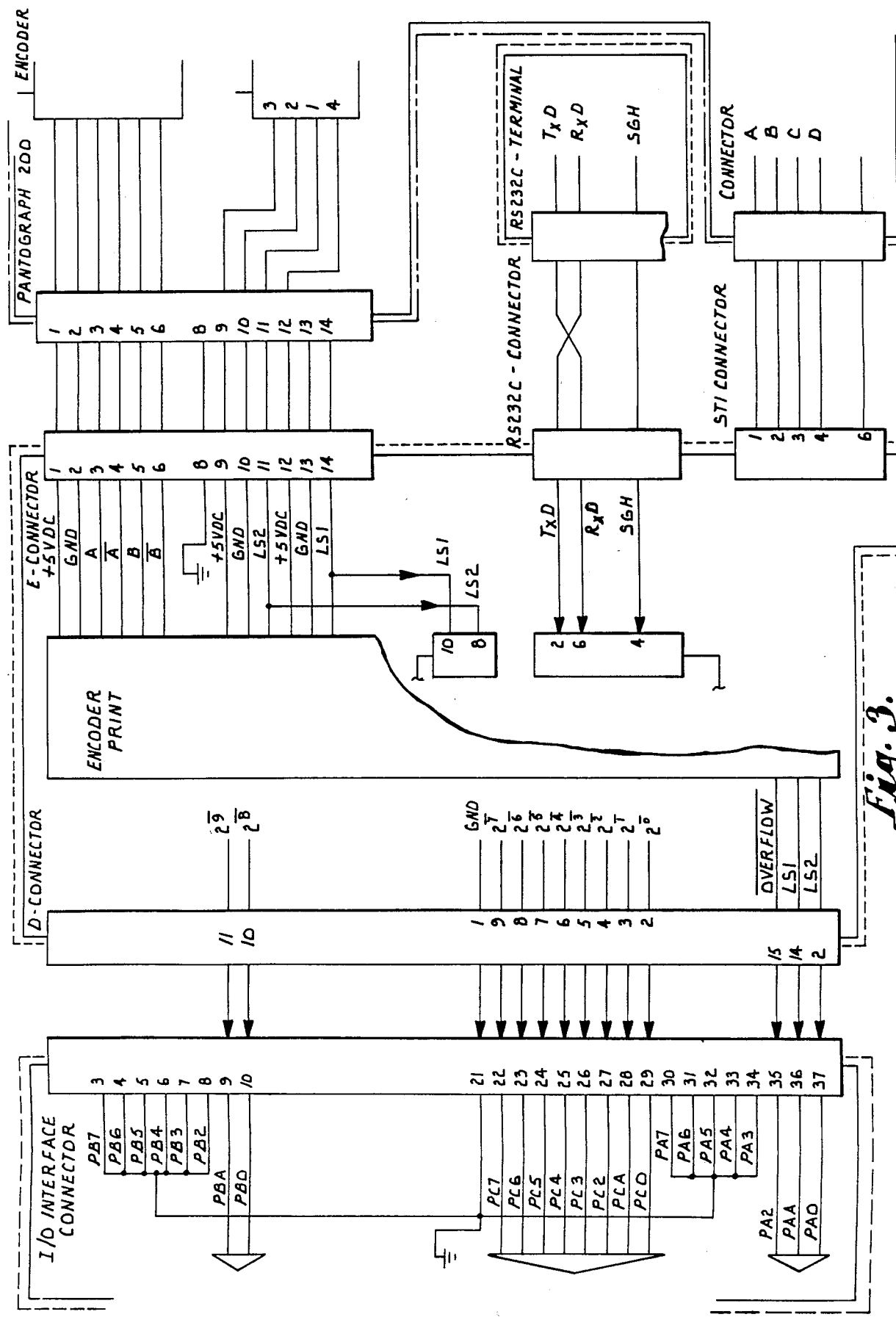
FIG. 3 is a schematic illustrating the various connections between the computer and the rotatable drafting arm structure.

FIG. 3 further illustrates the interface of the various elements of the system as shown in FIG. 6 by the use of corresponding legend lines.

The computer hardware includes an IBM PC 400 with video monitor as driven by a MS-DOS operating system. A PC printer 410 provides hard copy information and complements the video monitor associated with the PC. The blackbox 420 allows for the switching of the various hardware devices in the system to the common PC 400. One type of blackbox is available from BLACKBOX, a Micom Company, as shown in its 1986 catalogue on pp. 12–13. The "bluebox" 425 is a part of the automatic arm assembly and includes the driver control cards 294 and comparator card 299 for the automatic arm assembly 200 as to be subsequently discussed.

As the overall system may include a number of terminals at various job sites, the system may be driven by an independent base computer having a plurality of I-O ports, additional I-O processors and disc storage. Dedicated memory to enhance computer response may also be utilized. Each I-O board in the system may contain its own dedicated processor so as to allow more data input into the system by off-loading work from the main processor of the base computer.

The system centers around the concept of providing a job ticket display on the terminal or hard copy via the printers which sets forth various types of information e.g. customer data, specifications, instructions, shipping instructions and litho printer information.

Entry of such information, via the computer 400, allows various job personnel to track what was done, who did it, what was used and time spent for management analysis.

There are four basic software levels consisting of:
1. A production control system and scheduling with material logging;
2. A general ledger, including estimating and billing receivables;
3. A payroll level; and
4. A material and supply level.

The production control process includes three main phases of sales, production and accounting. The production phase is here of particular interest as it includes the structure for calculating the reduction/enlargement and orientation of the originally provided transparency 100 relative to that of the final image 110. The sales phase allows for entry of various information e.g. new jobs, work quantities, specifications, due dates, special instructions, shipping information and a price list for billing. Other information may be entered into the system at this time.

The production phase includes the scheduling of job shifts, employees, time, cost accounting and the procurement of information, materials and equipment. Included in this phase is the pre-planning step which completes the job tickets initiated in the sales phase. The pre-planner assigns forms, storage packs, tapes and floppies to the job as well as verifies all preentered data. All art work is inspected and accounted for at this time.

An important aspect of this phase is the proper entry, storage and control of information of the original image transparency 100 and its color-separated film images. Each originally provided image transparency 100 may be of a different size than the size of the desired final image 110 found in the layout 120. The color-separated films, which are submitted to the platemaker, must contain these separated images in register and at the correct size and orientation.

Accordingly, the relative size and angle of each final 110 image on the final layout 120 should be initially determined prior to entry of the original transparency 100 into storage. It is desirable to reduce the probability of operator error in calculating the relative size and angle at this time. Otherwise, such errors can be magnified in downstream steps which can lead to increased downstream production time and cost.

To assist the pre-planner a scaling and rotating arm system 200 with accompanying apparatus is provided. This system 200 provides transparency/image proportion and orientation factors for downstream use by others e.g. by the laser scanner operator. The basic hardware utilized is the IBM PC computer 400, a digital table 300, an automated control arm 200 and a printer 410.

Each job can be broken down into forms, pages per form and images per page. As each transparency 100 is scaled and angled, the subsequent work to be done and special information are user entered into the programmed computer 400 at that time so that all the required job information accompanies each transparency 100. The programmed computer 400 will upon demand display a form for entry of the requested information, inclusive of the job number, the percent reduction/enlargement of the provided transparency 100, the degree of rotation or angling of the transparency 100, the image description, the scanner program to be used and the floppy pack and tape number assigned. All images are to be listed on a job ticket by image, form and page number. This information can then be printed on a label 115, via the computer 400/printer 410 interface, for releasable affixation to the transparency 100.

The digital table 300 includes a backlit pad, an optional decision table and a log cursor 310. The cursor 310 interfaces with the digital table 300/PC computer 400 combination such that program-readable data of x axis/y axis positions on the table 300 is delivered to the programmed computer 400 upon logging each position by the cursor 310. (A RS-232 link is utilized).

A computer controlled, rotatable T-square assembly 200 is utilized on the digital table 300 as shown in FIGS. 4 and 5. One form of digital table 300 is a Cal Comp Digitizer (9100 series). The standard model includes two major components in the form of an active surface tablet where digitizing occurs and a transducer which relays the positional data. The transducer may be a pen stylus or the cursor 310 with cross hair lens for accurate point selection. A user menu of computer recognizable commands may also be included. Each tablet includes a number of grid wires having a high resolution, e.g. 1279 lines per inch, which enables the table to present to the computer 400 XY coordinate pairs for data analysis by the software program. The cursor/transducer 310 scans the grid wires and locates a specific point on the table surface upon logging. Integrated firmware enables logged XY coordinate values to be transferred to the computer 400 in a machine readable format for storage in computer memory and subsequent processing by the program software.

Another form of digital table 300/cursor 310 combination is utilized by Crosfield Electronics Ltd. Again the table 300/cursor 310 combination interfaces with the PC 400 such that the cursor, upon logging in any (X,Y) point on the digital table, will send computer-readable data of that point to the microcomputer. The program software will then utilize such (X,Y) positional data in a manner to be subsequently described.

In use, the pre-planner places the originally provided image transparency 100 on the digital table 300. First and second easily identifiable points (XT,YT) on the image in the original color transparency 100 are logged into the computer 400 by the cursor 310. Upon positioning the final layout 120 on the table 300, the same two identified points (XF,YF) on the image 110 in the final layout 120 are likewise logged by cursor 310 into the computer 400. The computer, via the program software, calculates the distances between the two points on the provided transparency 100 and on the final image 110. The resulting ratio is the percent enlargement or reduction factor of the originally provided transparency 100 relative to that image 110 on the final layout. This proportion/percentage factor is then associated with the previously computer-entered image information for that transparency 100/image 110 for subsequent use and/or recall. It will also be entered on a printed label 115 which is to be releasably affixed to the transparency 100 so as to accompany the same through the job stream. The proportion factor will also be used by the scanner operator for entry into the downstream scanner which automatically enlarges or decreases the transparency 100 by such factor.

The rotating arm apparatus 200 includes a rotatable rule 270 in the form of a modified T-square assembly 250 slidable along a vertical rail 210 mounted along the vertical edge of the digital table 300. If desired rail 210 also slides along an upper horizontal rail 220 on the table 300. A slidable bracket 225 is releasably clamped 230 along the vertical rail 210. The T-square assembly 250 includes a protractor head 260 which is rotatably mounted atop base 255 and to the sliding bracket 225 via bracket 265. Head 260 is rotatable about an imaginary vertical axis passing therethrough. The horizontal rule 270 is mounted to the base 255/head 260 combination in rotation therewith. One form of this T-square assembly is available from the Motah Drafting Machine Company, Model LM series or LMG series.

As shown in FIGS. 4 and 5 the modified T-square assembly includes a powered 295 stepper motor assembly 290 interfaced with the computer 400 via the control card 294. The stepper motor 290 is mountes atop a plate 291 fastened to the base 255 of the T-square. The motor 290 includes a shaft 292 which drives a belt 280 mounted at the end thereof and around a collar 285 interposed between the protractor head 260 and base 255. The stepper motor assembly 290 includes a driver/control card combination 294 for converting data calculated by the computer 400 into electrical signals which provides fixed mechanical increments of motor shaft 292 motion as opposed to conventional electrical motors with free running shafts. Such cards are part of the "bluebox" 425 associated with the rotating arm 250.

The motor 290 accurately positions a load (the T-square rule 270) without complicated and expensive feedback systems. As a digital device, it leads itself to integration into the digital system having microprocessor based controls.

Control logic in the form of index/driver cards 294 accepts commands from the computer relating to the direction and amount of incremental movements of rotation. The "blackbox" 420 switches the computer to the "bluebox" 425 which contains the above-discussed driver/index cards 294 and the comparator card 299. An RS232C standard interface communicates the calculated data, in the form of the number of increments that must be delivered to the stepper motor 290, to the index card 425 which sends the appropriate pulses to the stepper motor 290 of the rotating arm. the sequential pulses, provided via cable 295, dictate the amount and direction of incremental movement of shaft 292. Limit switches 289 may be utilized to present a fixed range of angular rotation if so desired. The comparator card, as shown in FIG. 2, counts the number of increments that the motor shaft 292 has been rotated. The final count is fed into the computer 400 which will compare the comparator card 299 count to its previously calculated data.

Various forms of stepper motor 290/control card 294 combinations are available in the art. Some sources are shown in the Superior Electric Catalog (MMC7871-5) of Bristol, Conn. entitled Modulyn Motion Controls. Another source is as shown in the Superior Electric Slo-Syn Micro series catalog (MSC-1086). In such combinations data from the programmed computer 400, corresponding to the desired amount and degree of rotation of shaft 292, will cause the control card to apply the appropriate amount of pulses to the stepper motor 290, so as to incrementally rotate the shaft 292, head 260 and arm 270 until the final desired position of the rul 270 is achieved.

In angling use, the original final image 100 and layout 120 is placed on the digital table 300 with the cursor 310 logging in two easily identifiable points (XF,YF) on the final image 110. The angle of the line connecting these two points relative to a pre-selected common axis, such as a 180 degree straight line, is calculated by the programmed computer. It is assumed that the pre-selected common axis corresponds to a straight line alignment indicia which normally appears on the drum of the downstream laser scanner drum.

The same two points (XT,YT) on the original image 100 are then logged into the computer by cursor 310. The computer then calculates the angle formed by the line (or its equivalent) connecting these two points and the pre-selected common axis. The difference between these transparency and image angles is determined. The computer 400 then calculates a position for placement of the x-rule 270 across the transparency 100, such that the intersection of the x-rule 270 and the pre-selected common axis forms an angle identical to the calculated difference. The program software then calculates the direction and number of increments that the stepper motor shaft 292 must be rotated so as to move the x-rule 270 to this position.

As above described this data, relating to the direction and increments of shaft 292 rotation, is delivered to the stepper motor assembly 290 via its associated control card 294. The motor 290, via the shaft 292/belt drive 280/collar 285 combination, rotates the protractor head 260 until the x-rule 270 is so positioned. An encoder in the stepper motor 290 senses this rotation and delivers motion and directional digital information to the comparator card 299 via cables 296 (FIG. 2). This card 299 counts the number of increments of movement of the energized motor 290 and delivers the final count to the computer 400 for comparison with the calculated value. If not equal the operator is informed of such error and of recalculation.

FIG. 2 illustrates the digital logic circuitry utilized in the comparator card. Hex inverters are indicated at 318, 322, Nand gates as 324 and counters as 330. Pins a19, b19, b20, and a20 have a low voltage thereon indicating that the rotating arm assembly is at rest. As such the counters are set at zero by NULL active low before an increase in voltage occurs. As the arm rotates the voltage on the pins changes which causes the flip-flop 310 to either enter or remain in one of its two stable states. As such a directional signal is obtained which will set the up/down pin on the binary counters 330 as a clock input is strobed by the directional signal after a 16–20 nsec delay. The counter 330 count is presented to the programmed computer for comparison with the calculated value. If not equal an error warning is given to the user on the video terminal indicating that the arm has not been properly set. The user may then repeat the above-cursor procedure. It is understood that other forms of counter circuitry may also be used.

The transparency 100 is marked with indicia 125 indicating the end points of the x-rule 270 line. The label 115, having a straight line edge, may also be affixed to the image 100 such that the lower straight edge is aligned with the x-rule 270. The transparency is delivered to the scanner operator with the information as to the size, rotation and angle being on the releasable label 115 affixed thereto. One laser scanner is a Crosfield Electronics Magnascan 645 I.S.S. or 645 I.M. The image 100 is loaded on the scanner drum such that the straight line indicia 125 on the image 100 is aligned with the straight line alignment markers on the scanner drum. It can thus be appreciated that the common axis involved in the program calculation corresponds to this straight line on the drum of the scanner. As such the alignment of the indicia 125, as presented by the calculated X-rule 270 position on the transparency 100, with the line of alignment on the scanner drum positions the image 100 at a correct orientation on the drum relative to the preselected common axis. Thus the orientation of the original image 100 is at the same orientation as the final image 110 in the final layout.

As above described the laser scanner breaks down the image on the transparency 100 into the selected colors and will direct the scanner to store the separated images on the previously assigned floppy, tape or disc packs at the final angle of orientation and at the calculated reduction/enlargement factor. As such, upon recall of the image from storage in downstream processing, the image iwll be presented to the worker at the correct size and layout angle. This procedure eliminates operator error in the downstream job processing.

Once the job has passed through the pre-planning phase job scheduling takes place. The programmed computer can then examine the job and calculate an estimated time for the job in each department. Such information is available for recall by the production manager who can assign available employees to the downstream task.

The steps of dot-etching, stripping, proofing, page composition, shipping and receiving are also employed. At all steps, the provided computer will display the appropriate job information to the worker charged with the appropriate task. Workers upon logging into the computer will be able to call up the previously entered image information. On completion of the worker's assignment, the worker can enter appropriate information as to that completed task into the system so that other workers can be advised of the same.

Other levels associated with the program software include the image management system which consists of an image data base which maintains information about the images stored therein. Images can be recalled by customer image number, job number and pack/tape number. Information as to images by customer job number and customer number can also be collected and readily recalled as well as other information available in the data base.

A scanner interface system is also employed. Other levels of the software system include a general ledger system, estimating, billing, receivables, payroll, performance, material and supply.

Finally, the software provides a cost and employee analysis level, a customer comparison level and a shipping level. Another program level allows for job layout, production suggestions, inventory control, service and maintenance of equipment information.

Although certain forms of this system, inclusive of the accompanying apparatus employing a novel method for scaling and angling of image transparencies has been disclosed, it is understood that the invention should not be limited except as set forth in the accompanying claims and the functional equivalents thereof.

What is claimed is:

1. For use in a system for producing color-separated films of a transparency appearing as a final image in a layout, said films used by a lithographic plate maker, said system including a drum-loaded scanner having a preselected axis thereon for separation of said image into said films and storage means for said color-separated films, apparatus for orienting said transparency onto said drum at the desired angle of said final image in said layout relative to said axis comprising:

a digital table having a multiplicity of cursor-readable data positions thereon;

a cursor associated with said table for logging positions of common first and second points on said transparency and said image positioned on said table;

a programmed computer adapted to receive data corresponding to said logged positions from said table, said programmed computer calculating a first angle of a line extending between said points on said final image and between a selected axis passing therethrough, said selected axis corresponding to said axis on said scanner drum, said computer further calculating a position for a base line intersecting a line connecting said points on said transparency;

a T-square assembly on said table having at least one rule;

drive means on said T-square for rotating said rule about an imaginary vertical axis passing therethrough;

means for coupling said programmed computer to said drive means, said coupling means rotating said T-square rule to a position indicative of said base line intersecting said points on said transparency, said base line alignable with said scanner drum axis, whereby to position said transparency on said drum at an angle congruent to said first angle of said final image in said layout.

2. The apparatus as set forth in claim 1 wherein said drive means comprises:

a stepper motor mounted on said T-square assembly, said motor having a rotatable shaft;

a collar mounted on said T-square and in movement with said rule;

a belt extending about said shaft and said collar with movement of said shaft rotating said collar and said rule.

3. The apparatus as set forth in claim 2 wherein said coupling means comprises a driver circuit interfaced with said computer and said stepper motor, said driver circuit having means for receiving data from said computer corresponding to the difference in positions between said T-square rule on said table and said base line intersecting said points on said transparency, said circuit sending pulses to said motor to energize the same until said T-square rule is aligned with said base line.

4. The apparatus as set forth in claim 1 further comprising:

comparator means for comparing the degree of movement of said rule to said calculated position from said computer, said comparator means measuring the degree of movement of said rule for providing data to said computer, said computer utilizing said comparator means data to analyze whether said rule has been rotated to said position as calculated by said computer.

5. The apparatus as set forth in claim 1 further comprising:

means for limiting the degree of rotation of said rule about said axis in clockwise or counter clockwise directions.

6. The apparatus as set forth in claim 5 wherein said limit means comprise limit switches associated with said T-square, said limit switches decoupling said programmed computer from said drive means upon movement of said T-square rule to a preselected position whereby to cease said rotation of said T-square rule.

7. The apparatus as set forth in claim 1 further comprising indicia means for fixedly locating points of said base line on said transparency, said points alignable with said scanner drum axis.

8. The apparatus as set forth in claim 7 wherein said indicia means comprises a label having a straight edge alignable with said base line and said scanner drum axis.

9. Apparatus for orienting a first image transparency with the angle of a second transparency relative to a preselected axis comprising:

a digital table having a multiplicity of cursor-readable data positions thereon;

a transducer associated with said table for logging positions of common first and second points on said first and second transparencies positioned on said table;

processing means adapted to receive data corresponding to said logged positions from said table, for calculating a first angle of a line extending between said points on said second transparency and between said selected axis passing therethrough, said means further calculating a position for a base line intersecting a line connecting said points on said first transparency;

a T-square assembly on said table having at least one rule;

drive means on said T-square for rotating said rule about an imaginary vertical axis passing therethrough;

means for coupling said processing means to said drive means, said coupling means rotating said T-square rule to a position indicative of said base line intersecting said points on said first transparency, said base line alignable with said preselected axis, whereby to orient said first transparency at an angle congruent to said second transparency.

10. The apparatus as set forth in claim 9 wherein said drive means comprises:

a stepper motor mounted on said T-square assembly, said motor having a rotatable shaft;

a collar mounted on said T-square and in movement with said rule;

a belt extending about said shaft and said collar with movement of said shaft rotating said collar and said rule.

11. The apparatus as set forth in claim 10 wherein said coupling means comprises a driver circuit interfaced with said processing means and said stepper motor, said driver circuit having means for receiving data from said processing means corresponding to the difference in positions between said T-square rule on said table and said base line intersecting said points on said first transparency, said circuit sending pulses to said motor to energize the same until said T-square rule is aligned with said base line.

12. The apparatus as set forth in claim 9 further comprising:

comparator means for comparing the degreee of movement of said rule to said calculated position from said processing means, said comparator means measuring the degree of movement of said rule for providing data to said processing means, said processing means utilizing said comparator data to analyze whether said rule has been rotated to said calculated position.

13. The apparatus as set forth in claim 9 further comprising:

means for limiting the degree of rotation of said rule about said axis in clockwise or counter clockwise directions.

14. The apparatus as set forth in claim 13 wherein said limit means comprise limit switches associated with said T-square, said limit switches decoupling said processing means from said drive means upon movement of said T-square rule to a preselected position whereby to cease said rotation of said T-square rule.

15. The apparatus as set forth in claim 9 further comprising indicia means for fixedly locating points on said base line on said transparency, said points alignable with points on said preselected axis.

16. The apparatus as set forth in claim 15 wherein said indicia means comprises a label having a straight edge alignable with said base line and said preselected axis.

17. Apparatus for orienting a rule at a desired position on a drafting table comprising:

data means on said drafting table for presenting locatable positions thereon;

logging means associated with said table for transferring said locatable positions on said table to a downstream processing means;

processing means interfaced with said logging means for receiving data corresponding to positions logged from said table, said processing means receiving data corresponding to a present position of said rule on said table and said desired position of said rule on said table;

a T-square assembly on said table containing said rule;

drive means on said T-square for rotating said rule about an imaginary vertical axis passing therethrough;

means for coupling said processing means to said drive means, said coupling means rotating said T-square rule to a position indicative of said desired position as calculated by said processing means.

18. The apparatus as set forth in claim 17, wherein said drive means comprises:

a stepper motor mounted on said T-square assembly, said motor having a rotatable shaft;

a collar mounted on said T-square and in movement with said rule;

a belt extending about said shaft and said collar with movement of said shaft rotating said collar and said rule.

19. The apparatus as set forth in claim 18 wherein said coupling means comprises a driver circuit interfaced with said processing means and said stepper motor, said driver circuit having means for receiving data from said processing means corresponding to the difference in positions between said T-square rule on said table and said desired position, said circuit sending pulses to said motor to energize the same until said T-square rule is aligned with said desired position.

20. The apparatus as set forth in claim 19 wherein said processing means comprises a computer having a program for receiving data corresponding to said recorded positions, said programmed computer presenting data to said driver circuit indicative of the number of pulses to be sent to said motor.

* * * * *